B. E. D. STAFFORD.
FLEXIBLE STAY BOLT CONNECTION FOR BOILERS.
APPLICATION FILED NOV. 16, 1915.
1,264,570.
Patented Apr. 30, 1918.
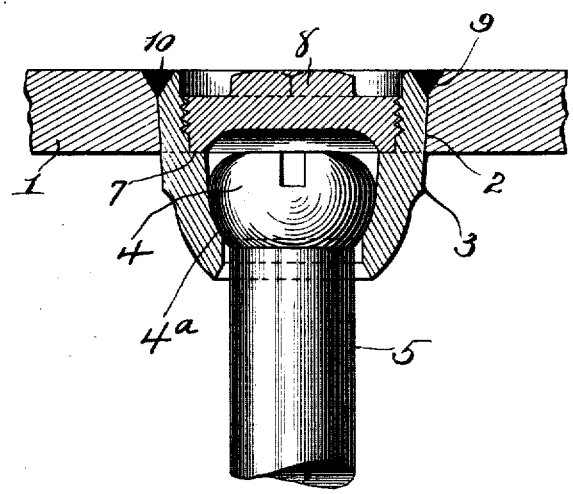
WITNESSES
E. D. Nottingham
G. F. Downing
INVENTOR
B. E. D. Stafford
By Seymour & Bright
Attorneys

UNITED STATES PATENT OFFICE.

BENJAMIN E. D. STAFFORD, OF PITTSBURGH, PENNSYLVANIA, ASSIGNOR TO FLANNERY BOLT COMPANY, OF PITTSBURGH, PENNSYLVANIA.

FLEXIBLE STAY-BOLT CONNECTION FOR BOILERS.

1,264,570.

Specification of Letters Patent.   Patented Apr. 30, 1918.

Application filed November 16, 1915.   Serial No. 61,759.

*To all whom it may concern:*

Be it known that I, BENJAMIN E. D. STAFFORD, a citizen of the United States, and a resident of Pittsburgh, in the county of Allegheny and State of Pennsylvania, have invented certain new and useful Improvements in Flexible Stay-Bolt Connections for Boilers; and I do hereby declare the following to be a full, clear, and exact description of the invention, such as will enable others skilled in the art to which it appertains to make and use the same.

My invention relates to an improvement in flexible stay bolt connection for boilers, and is an improvement on the construction disclosed in my application Serial Number 38,568 filed October 30, 1915.

In the application above referred to, the outer or roof plate of the boiler is provided with a depression around the bolt opening to receive the sleeve carrying the bolt head, the sleeve being welded to the roof plate.

In some situations it is desirable to have the bearing for the head of the bolt in a plane within or below the outer plate, or between the outer and inner plates, or where the space is restricted, it is sometimes necessary to have the housing for the head of the stay bolt flush with the outer surface of the outer plate, and the present invention consists in an outer plate having a conical opening, and a conical sleeve mounted in said opening with its outer end flush with the outer face of the plate and secured thereto in by welding the outer open end of the sleeve to the plate.

The accompanying drawing is a view in section of my improvement.

1 represents a roof plate or sheet of a locomotive boiler provided with an opening 2 for each stay bolt. These openings are tapering or conical and of a size to receive the outer enlarged tapering end of the sleeve 3, so that the latter rests on and is supported by the tapering wall of the opening in the plate. The contacting faces of the sleeve and plate are smooth and without threads, and the sleeve projects inwardly sufficiently to support the head 4 of the bolt 5 in a plane intermediate the inner and outer plates of the boiler.

The sleeve 3 is provided interiorly with a curved seat 4ª for the rounded head 4 of the stay bolt 5, and is also provided interiorly, adjacent to the outer end with an annular shoulder 7 on which the cap 8 rests and which makes a close joint with the cap, so as to prevent the escape of steam through the connection, the cap and sleeve being threaded above the shoulder 7 for securing the two parts together. The depth of the sleeve above, or to the outer side of the shoulder 7 is as great or greater than the thickness of the cap 8, so that when the latter is screwed home it will not project to any material extent beyond the plate 1.

In order to secure the sleeve against outward displacement, and to support the same against collapsing strains, I weld the sleeve to the plate at the outer edge of the joint between the two members. This is preferably done by chamfering the outer edge of the sleeve and the outer plate at the outer edge of the opening, so as to form a V, or equivalent shaped groove 9 into which the welding composition is placed.

In assembling the parts, the sleeves are inserted in the openings in the outer plates, after which the welding composition or filler 10 is placed in the V shaped groove and the welding is effected by the oxy-acetylene, or any other welding method, which will so fuse the metals that the union will be of a homogeneous character thereby securing all of the advantages of a sleeve integral with the plate.

With this improvement all the stresses on the stay bolt and sleeve or bushing due to boiler pressure, is borne directly by the plate 1 instead of by the welded joint, and as the contacting surfaces are conical all pulling stresses on the bolt tend to make a closer contact or union between the sleeve and plate and prevent any leakage in the event the weld should be defective.

I make no claim in this application to a sleeve secured in a conical opening in the boiler plate and welded thereto, the said sleeve projecting outwardly beyond the plate so as to support the bolt head in a plane outside of the said plate, as such construction is disclosed in my pending application No. 61,758, filed November 16th, 1915.

It is evident that slight changes might be resorted to in the relative arrangement of parts shown and described without departing from the spirit and scope of my invention. Hence I would have it understood that I do not wish to confine myself to the exact construction shown and described, except as required by the scope of the appended claims.

Having fully described my invention what I claim as new and desire to secure by Letters-Patent, is:

1. In stay bolt connection for boilers, the combination of a boiler plate having a conical threadless opening, and a sleeve having a plain conical outer surface mounted in said opening with its outer end approximately flush with the outer surface of the plate, the sleeve being secured to the plate by welding the outer end of the sleeve to the plate.

2. In stay bolt connection for boilers, the combination of a boiler plate having a conical threadless opening and a conical sleeve also without threads mounted in said opening with its outer end approximately flush with the outer surface of the plate, the said plate having its outer face adjacent the outer end of the sleeve beveled to receive a welding composition, the said sleeve being secured to the plate by welding.

3. In stay bolt connection for boilers, the combination of a boiler plate having a conical threadless opening, and a conical sleeve also without threads and mounted in said opening with its outer end approximately flush with the outer face of the plate, the said plate and sleeve having oppositely beveled faces forming a groove around the sleeve at the outer end of the latter to receive a welding composition, the said sleeve being secured to the plate by welding.

In testimony whereof, I have signed this specification in the presence of two subscribing witnesses.

BENJAMIN E. D. STAFFORD.

Witnesses:
EDWIN S. BYCE,
F. H. ALLISON.